United States Patent [19]
Borinski

[11] 3,725,705
[45] Apr. 3, 1973

[54] METHOD FOR STORING ELECTRIC ENERGY AND AN ELECTRIC ENERGY STORING SYSTEM

[76] Inventor: Adolfo Samuel Werner Borinski, Casilla de Correo, 4836-Correo Central, Buenos Aires, Argentina

[22] Filed: Feb. 2, 1972

[21] Appl. No.: 222,950

[52] U.S. Cl. ................................................310/5
[51] Int. Cl. ............................................H02n 1/00
[58] Field of Search ..........................310/5–7, 2, 10; 317/2, 3

[56] References Cited

UNITED STATES PATENTS

| | | | |
|---|---|---|---|
| 2,791,705 | 5/1957 | Vieweg | 310/5 |
| 2,847,586 | 8/1958 | Stiff | 310/5 |
| 3,360,663 | 12/1967 | Crewe et al. | 310/5 |
| 3,393,332 | 7/1968 | Fakan | 310/10 |

*Primary Examiner*—D. F. Duggan
*Attorney*—Karl W. Flocks

[57] ABSTRACT

Method for storing electric energy and an electric energy storing system for directly storing extremely high density electric charges, comprising a metallic conductor defining an endless non-orientable surface, preferably housed and insulatingly suspended in a refrigerated chamber, cooled below the transition point of said conductor, an insulated electricity conducting line connected at one point to said conductor and accessible from outside of said chamber, and means for at least temporarily creating an impelling force on the electrons of static electric charges to be fed over said line onto said conductor, to provide a direction controlled movement of electrons along said conductor.

23 Claims, 13 Drawing Figures

METHOD FOR STORING ELECTRIC ENERGY AND AN ELECTRIC ENERGY STORING SYSTEM

BACKGROUND OF THE INVENTION

1. Field of the Invention

The present invention refers to a method for storing electric energy, as well as to a system and more particularly to an apparatus for storing such electric energy. The apparatus is of extremely small size and weight in relationship to the amount of energy which may be stored, during a long time and without any substantial energy loss, as compared with known storage systems.

2. Description of Prior Art

It is an aim of industry in general to be able to store large amounts of energy, particularly electric energy. Storage means so far suggested are not directly storing electric energy, but transform the electric energy supplied to the storage source, into another kind of energy which may be retransformed into electric energy upon being used. Typical examples of storing electric energy by transforming the latter, are batteries and accumulators, where the electric energy is chemically transformed. Other energy transformers are turbines, dynamos and the like rotary electricity generating devices, where mechanical energy, particularly hydraulic energy and heat energy, is transformed into electric energy, but these transformers are not able to store energy.

Reference has also to be made to capacitors, which are used to obtain pulse feeding. Capacitors must be connected to a true source of electric energy, so that actually a capacitor is not a storage unit in the sense as here meant.

Finally, it is well known that an endless conductor, such as a sphere, which is the best example can be given, can be charged with static electricity until reaching its potential barrier. The vector direction of the repelling forces of the charges are always perpendicular to the surface of the conductor, i.e., pointing outwards. Thus, diametrically opposite charges on the sphere will define coaxial vectors in opposite directions, which will tend to discharge the electric charges stored on the conductor, as soon as the maximum admissible density of charge has been reached and the potential barrier of the metallic surface breaks down. Once such a state is reached, it is impossible to increase the storage charge on the conductor, even not, by applying higher voltages.

Such potential barrier is reached very fast, so that this system is not used in practice, to act as storage means, to drive useful apparatus for long periods.

SUMMARY OF THE INVENTION

The present invention has a fundamental aim, to provide electricity storage means, which define a source and which enable to store large amounts of electric energy, which may be used at any time, for any desired purpose.

The invention is based on the concept that a new geometry had to found for the endless conductor, so that no mutually repelling forces of diametrically opposite charges, which in other words are diametrically opposite vector charges, are created, as happens in the above referred sphere.

To this end an electric conductor is proposed which has such an endless non-orientable surface, that the forces or vectors of diametrically opposite electric charges are substantially perpendicular to each other; thus no mutual repellent forces are created. In view of this arrangement, the charging density on such a conductor may be very considerably increased, as compared with all the endless conductors so far used. The conductor is to be connectable to a supply line for supplying static electricity to be stored on the conductor.

It is furthermore known that the electric resistance of any electric conductor, provided that it is made of a suitable metal and/or alloy, may be substantially eliminated by cooling said conductor below its transition point, whereby such a conductor becomes superconductive. By applying this concept to the present invention, the charges which are stored on the conductor may be infinitely maintained, without any substantial energy loss.

At least two examples of electric conductors which satisfy these requirements may be given, one of it being a Möbius band-ring, —hereinafter called "Möbius band"— which is, at least theoretically, a two dimensional means and the other, a three dimensional means could be a Klein's bottle. Both of these means define a device with an endless non-orientable surface. Either of these means are preferably housed within a suitable chamber, where the temperature is maintained below the transition point of such means.

The electric energy storage system of the present invention may be employed in many cases to drive electric motors, where nowadays internal combustion engines and other types of prime movers are used, which generate noxious combustion gases which are sent to stack and thereby pollute the atmosphere; thus one advantage of the present invention is that the storage system enables to avoid air pollution.

A further advantage of the present invention is that the size and weight of the storage system, in relationship to the amount of energy which may be stored, is so small that it becomes easily conveyable, even to remote zones on the earth or outside it.

Another advantage of the present invention is that the system is a completely statical one, so that the manufacture, loading and unloading, as well as its maintenance becomes extremely simple and of low cost.

The electric energy storage system of the present invention can also be produced in a so-called miniature size, to operate in combination with electrically driven miniature devices, such as for instance a pacemaker used in modern medicine. In this event the refrigerating system of the storage should form an integral part thereof and the storage system may provide the necessary energy for the refrigerating system.

According to one generic development of the invention, in order to actually enable to store large amounts of electric energy on a Möbius band or on a Klein's bottle, made of a suitable metal or alloy and which is conveniently refrigerated below its transition point, it is furthermore suggested to provide means for temporarily generating a magnetic field which is perpendicular to a plane passing through the center line of such a conductor in the case of a Möbius band or at least to part of the conductor, in the case of a Klein's bottle, in order to start the movement of the electrons on such conductor, upon applying or forwarding electric charges to be stored. In other words, such magnetic field will produce an impelling force on the electrons of the static electric charges to be fed over a feeding line onto said conductor, to provide a direction controlled movement of electrons along said conductor. This arrangement forms part of the means which allow for a high density charge on such a conductor.

Instead of temporarily generating a magnetic field, it is also possible to achieve the same result of impelling the electrons, by using in combination with the Möbius band or the Klein's bottle, an induction accelerator or a Cockroft-Walton accelerator, which latter operates on the basis of potential differences of the electric field generated, as is already known.

No matter which type of means is used to control the direction of movement of the electrons on the non-orientable surface of the conductor, it is furthermore to be borne in mind, that these electrons become automatically longitudinally polarized due to the geometric property of such a non-orientable surface provided both by a Möbius band as well as by a Klein's bottle.

Accordingly, the present invention refers to a method for storing electric energy, comprising the steps of providing at least one electric conductor having an endless non-orientable surface, said conductor being preferably made of a metal or alloy capable of becoming superconductive upon cooling it below its transition point; if the conductor is of the superconductive type, then cooling means must be provided to cool said conductor below its transition point; furthermore, means for creating an impelling force on the electrons of the static electric charges to be fed onto said conductor are to be provided and may consist of a magnetic field perpendicular to a plane passing through the center line of said conductor, or equivalent means such as an induction accelerator or a Cockroft-Walton accelerator, starting to electrically charge said conductor and generating said magnetic field or equivalent at the latest after having started with the electric charge to move the electrons along said conductor through the influence of said magnetic field or equivalent and to longitudinally polarize said electrons due to the geometric property of said non-orientable surface, thereby increasing the capacity of said electric conductor to allow for extremely high density electric charges.

In the foregoing definition of the method it has been stated that the magnetic field or equivalent has to be generated "at the latest" after having started the electric charging. In other words, the magnetic field or equivalent may either be generated before starting with the loading of the electric energy or simultaneously when starting with the loading or a short period after having started with said loading of electric charges on the storing conductor. The electrons become thus accelerated on the conductor and facilitate further charging. As soon as the loading has been completed, the magnetic field or equivalent may be disposed of. Care must be taken that the flowing speed of the electrons is kept below 90 percent of the velocity of light, since otherwise the electrons would become too heavy to allow for a proper high density electricity charging of the conductor or source.

The present invention is likewise concerned with an electric energy storage system, comprising at least one electric conductor having an endless non-orientable surface, said conductor being preferably a metallic conductor capable of becoming superconductive upon cooling it below its transition point, said conductor being preferably housed and insulatingly suspended in a casing defining a chamber, preferably means are provided for cooling said conductor within said chamber below the transition point of said conductor, controllable means are provided for creating an impelling force on the electrons of the static electric charges to be fed onto said conductor through an insulated static electricity conducting line connected to said conductor and projecting out of said casing, said conductor being connectable at one point through said line to static electricity feeding means for loading said conductor, and said line being furthermore connectable to means to be driven by the static electricity stored on said conductor.

DESCRIPTION OF THE PREFERRED EMBODIMENTS

Figure 1:
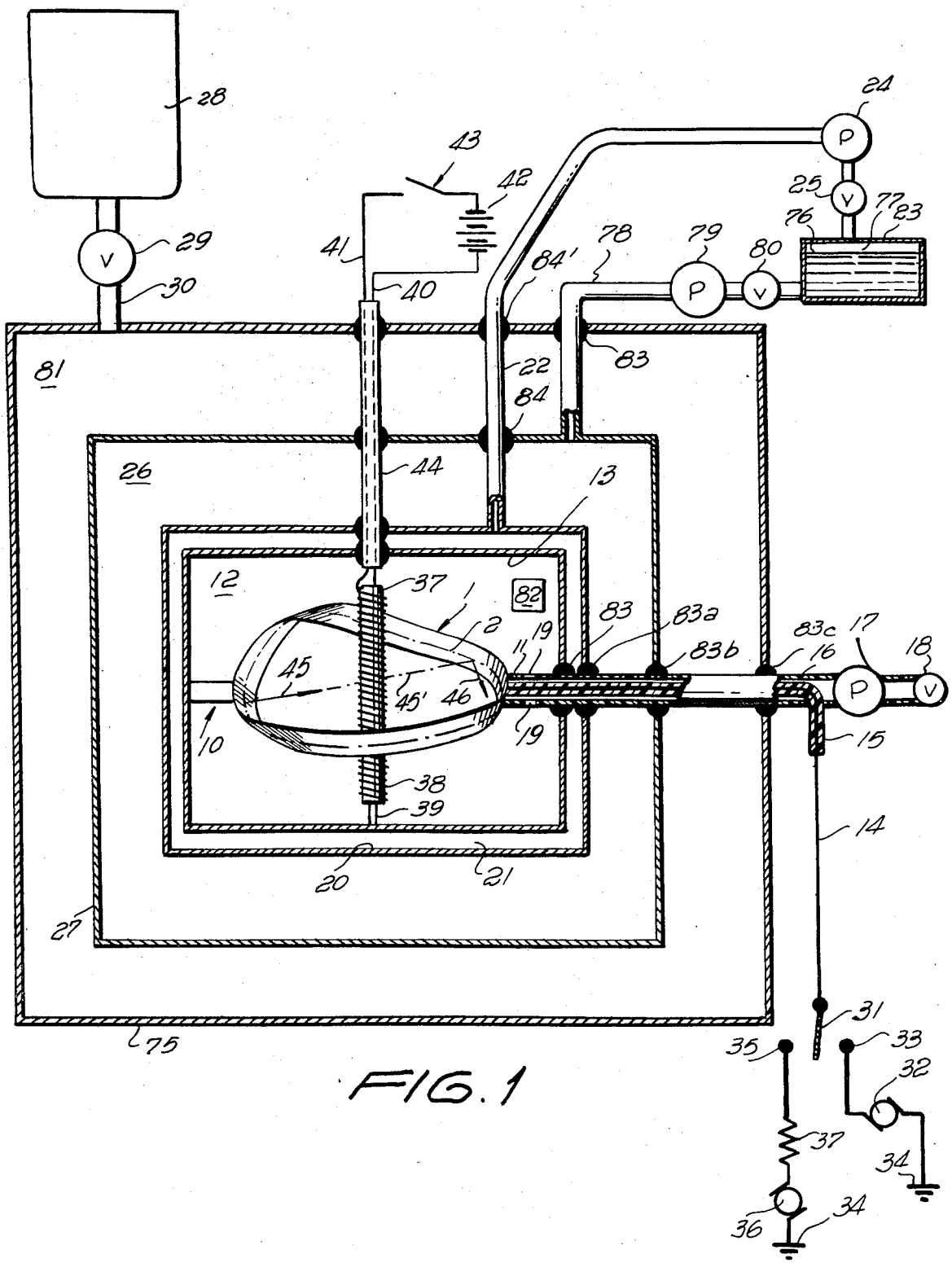
FIG. 1 is a schematical layout of the electric energy storing system according to the present invention.

Referring first to FIG. 1, an apparatus is shown therein consisting of a basic storage unit in the shape of a Möbius band 1, defining an endless non-orientable surface made of a metal or a metallic alloy liable to become superconductive, at a technically reasonable temperature.

In recent years technology has advanced considerably in achieving metallic alloys, where the temperature of the transition point has been increased. So far no ferromagnetic metals and/or metallic compounds have been found which can be used for this purpose. However, some semi-metallic compounds may be usable for the purpose.

To give some examples, the transition point of lead (Pb) is 7.26°K (Klevin). The transition point of columbium (Cb) is 9.22°K. The transition point of a binary alloy such as bismuth lead (Pb—Bi) varies between 8.8 and 7.3°K. The transition point of a semi-metallic compound such as columbium-carbon is 10.1°K.

The Möbius band 1 is an endless parallelepipedic conductor, preferably a flat strip having a rectangular cross-section with an extremely small thickness in relationship to its breadth. It is a non-orientable one sided strip with an odd path twist $1/2, 3/2, 5/2, -\pi$ over $2\pi$ of length. To facilitate the explanation of the invention, it may be considered that the Möbius band 1 has an endless center line 2.

Conveniently, the Möbius band which is a metallic conductor is mounted on a support, so that such Möbius band can be extremely thin and the support acts at the same time as an insulator having a high electric resistance.

Figure 9:
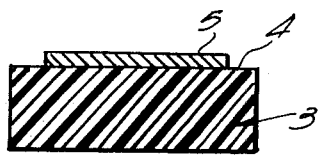
FIGS. 9 and 10 show in cross-section two steps of producing a Möbius band on a suitable insulated support.
Figure 10:
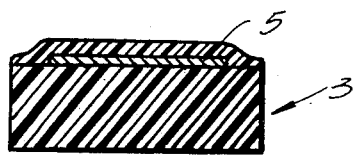
Figure 11:
FIG. 11 is a top plan view of a band, the ends of which are to be joined to form a Möbius band.

In practice, such a Möbius band may be produced by providing a plastics band 3 (FIG. 9) defining an electricity insulating support on one of its larger faces 4 of which a thin metallic conductive layer 5 is deposited, for instance by vacuum evaporation in an electric field — a well known technique. The metallic conductive layer 5 is so deposited, that the side end portions thereof do not reach the side end portions of the face 4. This intermediate band product is then sheathed, as shown in FIG. 10, by applying a second layer of insulating, preferably plastics material 6. The resulting product is a band 7 (FIG. 11) having the end portions 8 and 9. These end portions 8 and 9 are then joined through an odd half twist to define the Möbius band 1 in such a manner that the metallic conductive layer 5 becomes an endless layer. Actually the Möbius band 1, seen from a more generic concept, need not to be sheathed within an insulating layer, provided that the consistency of the metallic conductor 5 is self-supporting to define a circular or elliptical shape.

According to the preferred embodiment, the Möbius band 1 is supported at diametrically opposite portions by holders 10 and 11 (FIG. 1), within a chamber 12 defined by a first casing 13.

Although casing 13 is shown as a cubic casing and the same is true for the other casings 20, 27 and 75, it may become more convenient to build spherical casings, particularly if large size electric energy storage systems are to be manufactured.

Holders 10 and 11 have to maintain the Möbius band 1 in a spaced apart relationship with regard to the walls defining the first casing 13. Holder 10 is made of electricity insulating material. Holder 11 includes a conductor, hereinafter called line 14, duly insulated by an electricity insulator member 15 surrounded in spaced apart relationship by a tubular member 16, likewise made of electricity insulating material and which actually supports the Möbius band 1. The tubular member 16 is connected to a vacuum pump 17, further connected to a check valve 18. Tubular member 16 includes suction perforations 19 arranged within chamber 12. Thus, if vacuum pump 17 is energized, it is capable of producing high vacuum within chamber 12 and check valve 18 assures that once the vacuum pump 17 is deenergized, the vacuum in chamber 12 is maintained and becomes sealed from outside.

The first casing 13 is surrounded by a second casing 20 defining with the outside face of the first casing 13 a small volume insulating chamber 21. Chamber 21 is connected through pipe 22 to the top of a tank 23 defining a source of liquid helium (He), the level 76 of which provides an upper helium gas chamber 77. A pump 24 and a controllable two way check valve 25 are arranged within pipe 22. Thus, chamber 21 may be filled with helium gas from tank 23. The second casing 20 is surrounded by a third casing 27, defining a large volume refrigerating chamber 26. Chamber 26 is connected through pipe 78, pump 79 and check valve 80 to the bottom of tank 23.

Conveniently, the third casing 27 is surrounded by a fourth casing 75 defining a large volume chamber 81 to be filled with liquid oxygen, nitrogen or the like cheap liquefied gas, as compared with the helium and to which end said chamber 81 is connected to a source of liquid oxygen, nitrogen or the like liquefied gas 28, which acts as a source to supply the liquid oxygen or the like to the outer chamber 81. A control valve 29 is arranged in feeding pipe 30 connected to casing 75 and bottle 28. Thus, additional liquid oxygen or the like may be supplied, when necessary.

The arrangement so far described enables to cool the metallic Möbius band below its transition point. Once the arrangement has been built, in order to cool the Möbius band for the first time below its transition point, air is maintained in chamber 12 to act as a heat interchanger. Chamber 21 is filled with helium gas by energizing pump 24 to convey gas from gas chamber 77 into chamber 21. Chamber 21 will only have to be filled with a very small amount of said gas which has only to act as a cooling transmission agent between chamber 12 and 26. Once chamber 21 is conveniently filled, pump 24 is deenergized and check valve 25 will be set for blocking the helium gas within chamber 21. At the same time pump 79 is energized so that liquid helium is conveyed from tank 23 through pipe 78 to partially fill chamber 26 with liquid helium. In order to conveniently insulate chamber 26 from outside, chamber 81 in entirely filled with liquid oxygen or the like by opening valve 29. Thus, there is an additional heat insulator between outside and chamber 26. To start the cooling process, pump 79 is now energized to operate in reverse direction. Bearing in mind that chamber 26 is only partially filled with liquid helium, pump 79 will now suck helium gas from the top portion of chamber 26 through pipe 78 and bubble it through the remaining liquid contained in tank 23. Thus the atmospheric pressure, originally present in chamber 26 will be decreased so that the helium starts to boil and withdraws thereby calories from chamber 12 through chamber 21. The pumping action of pump 79 will be continued until the temperature in chamber 12 will be well below the transition point of the Möbius band 1. To this end a temperature sensor 82 — for instance of the resistor type, as is well known in the deep cooling art — is housed in chamber 12 and in operative relationship with pumps 79 and 24 and valves 25 and 80. Once a suitable temperature has been reached in chamber 12, sensor 82 will energize pump 24 to withdraw the helium gas from chamber 21 which is sent back into tank 23. At the same time pump 17 will withdraw the air from chamber 12. As soon as an optimum vacuum has been reached in chambers 12 and 21, pumps 17 and 24 are deenergized and valves 25 and 18 assure for a correct blocking of the vacuums in chambers 12 and 21. Pump 79 may be energized again in opposite direction to refeed additional liquid helium into chamber 26, so as to suitably fill said chamber to an adequate level and maintain said chamber at approximately atmospheric pressure, whereupon valve 80 is blocked. The Möbius band will now be at a temperature to become superconductive, and chamber 12 is suitably isolated from outside.

In spite of the heat insulation provided, it has to be admitted that due to heat energy radiation and the electric conductors, which when operating will generate a certain amount of calories, the temperature within chamber 12 will very slowly increase.

Sensor 82 is conveniently set, to transmit the necessary signals to outside to repeat the pertinent steps of the cooling process, by operating pumps 24 and 79, as hereinabove described. During the recooling process, it will not be necessary to refeed air into chamber 12, where the relative existing vacuum should be maintained. Thus, the withdrawal of excessive calories from chamber 12 through chamber 21 into chamber 26 will be somewhat slower, but this does not imply any substantial drawback, since sensor 82 will energize pumps 24 and 79 well before the temperature in chamber 12 reaches the actual transition point of Möbius band 1.

Tubular member 16 passes through chambers 21 and 26 to outside and is sealed by seals 83, 83a, 83b, 83c to casings 13, 20, 27 and 75. Electricity insulator member 15 projects out of tubular member 16, outside of the outer casing 75. Line 14 is connected to a switch 31 further connectable to a static electricity generator 32 through terminal 33. Generator 32 is also connected to ground 34. Generator 32, as will be later better apparent, is used for charging the Möbius band 1 with electric charges. Switch 31 may also be connected to terminal 35 forming part of a useful machine to be driven by the electricity stored on the Möbius band. The useful machine is shown as a motor 36 including a resistor 37 to schematically indicate the mechanical or equivalent load which has to be driven by the motor 36 which is also connected to ground 34.

Pipe 22 passes through chambers 26 and 81 to outside and is sealed by seals 84, 84' to casings 27 and 75. Pipe 78 is sealed to casing 75 by seal 85.

In order to charge the Möbius band 1 with static electricity through line 14, one condition which should be met, in order to provide for the possibility of high density charge is that the electrons of the static electric charges to be fed over line 14 onto said conductor are subject to an impelling force to provide a direction controlled movement of electrons on said conductor, which is the Möbius band 1. This may be achieved in different ways.

Referring again to FIG. 1, in this embodiment means are provided to create a strongly concentrated magnetic field for impelling the above referred to electrons. More particularly, it may be admitted that a plane (not shown) passes through center line 2 of the Möbius band. For starting the charging of the Möbius band it is necessary to dispose of said strongly concentrated magnetic field which has to be perpendicular to the plane passing through the center line 2; to this end, an electromagnetic coil 37 is mounted on a coil support 38 standing on a foot 39 resting on the casing 13. Coil 37 perpendicularly passes through the central portion of the plane defined by the center line 2. The coil is connected through lines 40, 41 to an energy supply source 42 and switch 43 enables to energize and deenergize the electromagnetic coil 37. A tubular insulating member 44 contains part of lines 40 and 41 and sealingly passes through casings 13, 20, 27 and 75. The main object of member 44 is to assure that there is substantially no vacuum and/or frigories leakage from chamber 12 to outside.

As to the operation of the electric energy storage system hereinabove described, it has already been explained that in first instance it is necessary to produce a high vacuum and a low temperature in chamber 12, so that the Möbius band 1 will be at a temperature below its transition point. Thereafter, the charging of the Möbius band may be started by connecting switch 31 to terminal 33 and energizing the static electricity generator 32 to be able to load the Möbius band through line 14. Switch 43 must be closed in order to generate the strongly concentrated magnet field which must be of sufficiently high density so as to permeate the Möbius band in a direction which is orthogonal to the axis (not shown) passing through supports 10 and 11. The magnetic field should never exceed the threshold field that corresponds to the temperature of the Möbius band. Upon thus having connected line 14 to the generator or high voltage source 32, the electromagnetic field generated by coil 37 will assure that the electrons of the electric charges will start to move along the Möbius band 1. More particularly, the electromagnetic field will accelerate the electrons of the current supplied to the Möbius band 1 and care should be taken that the velocity of the flowing electrons will not reach beyond 90 percent of the velocity of light, because then the weight of the electrons would increase beyond admissible limits. As soon as the charging of the Möbius band has been completed, the electromagnetic field becomes unnecessary, so that switch 43 may disconnect coil 37 from the supply source 42.

Due to the particular geometry of the Möbius band and more particularly the twist thereof, said band impresses on the orbiting electrons an intrinsic rotation, call "spin," about their axes, parallel to their directions of motion. This implies that the electrons become longitudinally polarized.

In case of the known conductors, such as the sphere described in the "Description of the Prior Art," the direction of the repelling forces of diametrically opposite electrons and more particularly the electric vector charges are pointing outwards — orthogonally to the surface of the conductor — in opposite directions, causing the physical outward pressure, which limits the possibility of charging the conductor.

According to the present invention, the direction of two diametrically opposite vectors 45, 46 representing the reciprocal repulsion of two diametrically opposed electrons, are not orientated on the Möbius band in opposite directions, but are perpendicular to each other defining an angle of 90° as shown by the dotted line 45', which is a prolongation of vector 45, which cuts vector 46 at the center line 2. This is due to the twist of 90° of the Möbius band sections over a distance of 180° on the Möbius band. The physical consequence of this geometrical fact is that there is no outward pressure produced by the reciprocal repulsion of diametrically opposite electrons. Thus, it may be stated that there is no pressure at all and in consequence it is possible to charge the twisted conductor, more particularly the Möbius band or any other similar conductor defining an endless non-orientable surface with an incomparably higher electric charge density than it is possible in the known arrangements.

It is however believed that even in the case of a Möbius band there must exist a limit of the density of charge, but its numerical value is not known at present.

To use the electricity stored on the Möbius band 1, switch 31 has to be connected to terminal 35.

If the coil 37 is manufactured of a superconductive metal, then no heat is generated and the coil will merely provide the required electromagnetic field, so that chamber 12 is maintained for a longer period at a temperature below the transition point of the Möbius band 1.

The arrangement so far described may be used both for small size, as well as for large size devices. The electric storage system may however also be provided for miniature arrangements, particularly for pacemakers and in that event it may be sufficient to provide casings 13 and 20 in combination with particular means housed within casing 12 which are able to periodically produce a refrigerating cycle to compensate any loss of frigories within chamber 12. To this end, reference will now be made to FIG. 2, where the same reference numerals for identifying alike parts are used as in FIG. 1, but preceded by the prefix "100." In the embodiments to be later described in connection with the remaining figures, a similar system as to the reference numerals will be followed, but each embodiment will be preceded by a prefix of another series of hundreds.

Figures 2, 3:
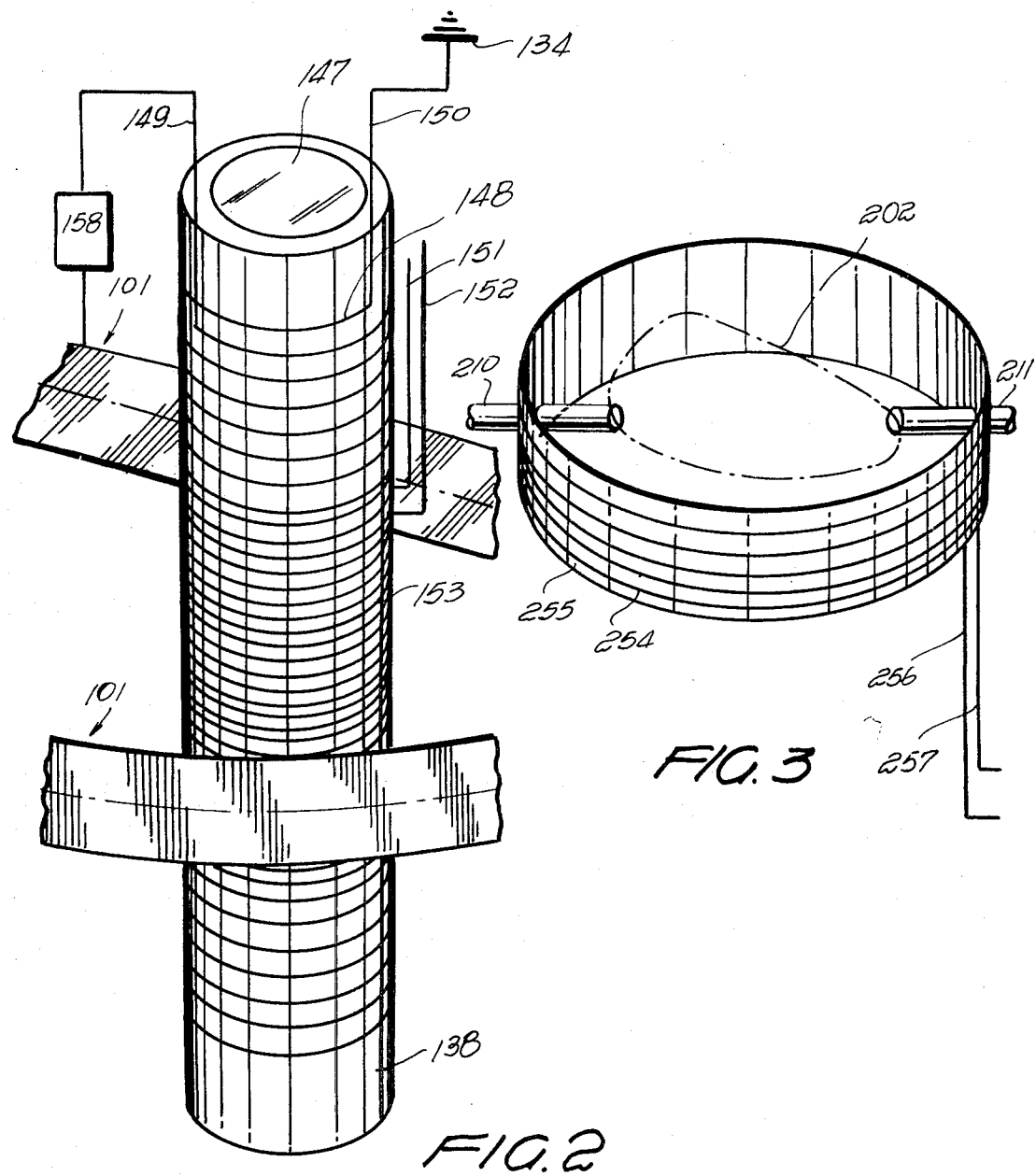
FIG. 2 is a detail in perspective view of an alternative embodiment as far as the generation of the electromagnetic field, and cooling means are concerned.
FIG. 3 is a detail in perspective view of a further alternative embodiment as far as the generation of the electromagnetic field is concerned.

In the embodiment of FIG. 2, the coil support 138 is a hollow tubular member closed by a lid 147 and housing in it paramagnetic crystalline salts, capable of being magnetized and upon adiabatic demagnetization are capable of absorbing heat and thereby cooling the surrounding ambient. Typical examples of the above mentioned crystalline salts are nickel sulphate and gadolinium sulphate. The above described arrangement is well known in the art of deep cooling.

In this embodiment, coil support 138 is provided with two coils 148, 153. More particularly, coil 148 is a weak field generating coil to act on the crystals and which has a length substantially equal to the length of tubular member 138. Coil 148 has the conductor lines 149 and 150. Conductor line 149 is connected to the Möbius band which acts as a supply source through a pulse extracting means 158, such as a capacitive circuit, which will assure that coil 148 is periodically energized. Conductor 150 is connected to ground 134. Since this arrangement is to be used in pacemakers, the human body will actually provide the necessary ground. In this event sensor 82 of FIG. 1 becomes unnecessary.

Coil support 138 further supports an intense field generating coil 153. Lines 151 and 152 form part of the intense field generating coil 153, the height of which is such that it falls within the zone of the Möbius band 101 (only partially shown). In other words, the height or length of coil 153 is shorter than that of coil 148. Coil 153 provides the necessary magnetic field for accelerating the electrons of the static current to be charged onto the Möbius band 101. Lines 151, 152 are the equivalent of lines 40, 41 in the embodiment of FIG. 1.

In the embodiments so far described, the Möbius bands are actually for small size units. If the Möbius band is of large size, then it would not be economically sound, to provide a coil in the center of the space encircled by the Möbius band, because such coil would have to be too large. In the embodiment of FIG. 3, the Möbius band is not shown, but only its center line 202 and the holders 210 and 211. Thus, overburding of the drawing is avoided. The Möbius band is surrounded by an electromagnetic coil 254 mounted on a cylindrical coil support 255, likewise supported by holders 210, 211. Coil 254 is connected to lines 256, 257 which are to be considered as equivalent to lines 40, 41 of FIG. 1. Thus, coil 254 is capable of generating the necessary magnetic field to accelerate the electrons of the electric charges to be fed on the Möbius band.

Other ways of accelerating the electrons to be charged on the Möbius band will be later described in connection with FIGS. 8 and 13.

Figure 4:
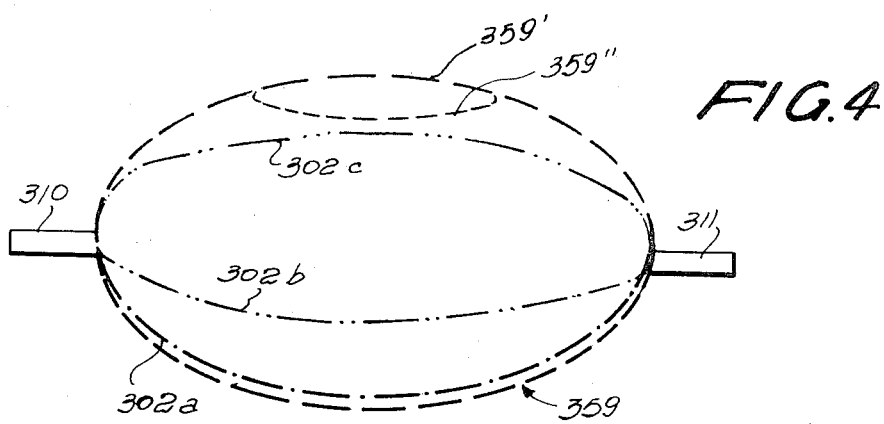
FIG. 4 is a schematic illustration showing the possibility of using several Möbius bands to define an elliptical entity.
Figure 5:
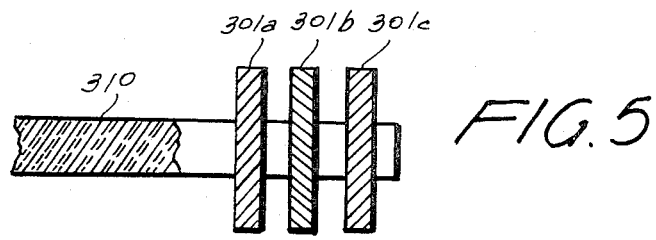
FIG. 5 shows in longitudinal section, in more details, the insulated holder for the several Möbius bands of the elliptical entity of FIG. 4.
Figure 6:
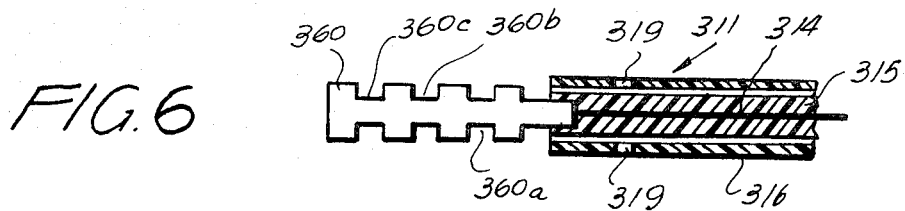
FIG. 6 shows in longitudinal section, in more details, the conductive holder for the several Möbius bands of the elliptical entity of FIG. 4.

In the embodiments so far described, only one Möbius band has been used. It is however conceivable that several Möbius bands may be used in the refrigerated chamber, such as chamber 12 of FIG. 1. These Möbius bands may be supported on common supports 310, 311 (FIG. 4), equivalent to supports 10 and 11 of FIG. 1, in such a manner that as a whole they define a more or less elliptical body. Since it becomes extremely difficult to represent such a body in the drawings, in FIG. 4 only the front portion of three center lines 302a, 302b and 302c are shown, respectively identified by axis lines with one, two and three dots. The dotted line 359 intends to represent the outer periphery of the elliptical body where the Möbius bands are so arranged that they provide for a central axial throughopening defined by portions 359', 359" (only visible on the top, but also existing at the bottom portion) through which a coil of the type of coil 37 (FIG. 1) may be inserted. In FIG. 5 holder 310 is more specifically shown as consisting of a plastics rod supporting three spaced Möbius bands 301a, 301b and 301c. The other support 311, is more specifically shown in FIG. 6, and consists of a good electricity metallic conductor holder member 360 having spaced apart recesses 360a, 360b and 360c for supporting the Möbius bands 301a, 301b and 301c — not shown in FIG. 6, but shown in FIG. 5. Holder member 360 is connected to line 314 surrounded by electricity insulator member 315, in turn surrounded in spaced apart relationship by a tubular member 316 having the suction perforation 319, so that the arrangement is similar to the arrangement of holder 11 of FIG. 1. Thus, line 314 may be used for charging the Möbius bands 301a, 301b, 301c, and for discharging them, when connected to an arrangement to be driven, such as arrangement 36, 37 of FIG. 1.

Figure 7:
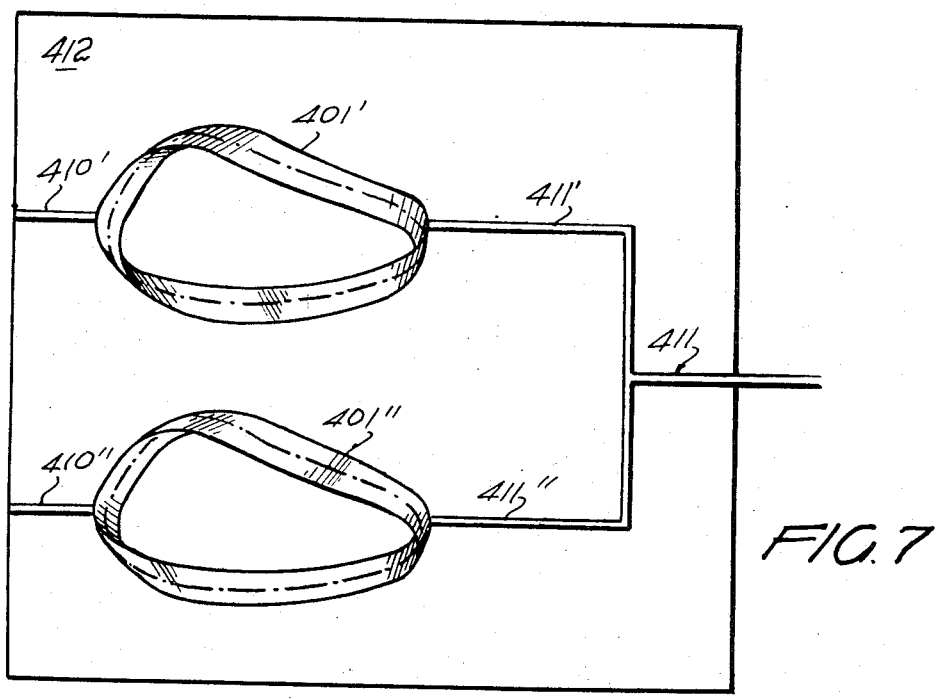
FIG. 7 is a layout of another arrangement of several Möbius bands.

In the embodiment of FIG. 7 the chamber 412 houses two Möbius bands 401' and 401" in a substantially parallel relationship. To this end, two electricity insulating holders 410' and 410'' are provided and an electricity conductive U-shaped holder 411 having the branches 411' and 411''. It will be obvious that electricity conductive holder 411 will be able to simultaneously lead Möbius bands 401' and 401''.

Figure 8:
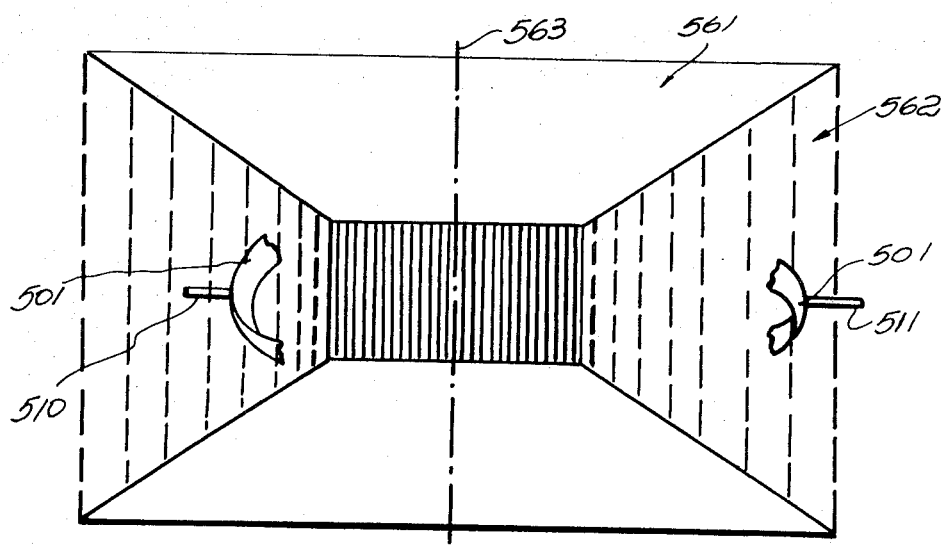
FIG. 8 is a schematic layout where the acceleration of the electrons of the electric charges to be stored on the Möbius band is produced by an induction accelerator.

In FIG. 8 another type of electromagnetic field generator is shown, known as an induction accelerator 561. This type of generator produces an electromagnetic field 562 which is strongest in its center portion and weakens towards outside. A Möbius band 501 of which only portions are shown, may be so housed within magnetic field 562, in such a manner, that the holder 511 which defines the loading connection with the Möbius band 501 is within the weakest zone of the magnetic field 562, whereby the acceleration of the electrons of the electric charges, when loading the Möbius band is suitably performed. In other words, the Möbius band is not concentrically arranged with regard to axis 563 of the body defining the induction accelerator 561.

Figure 12:
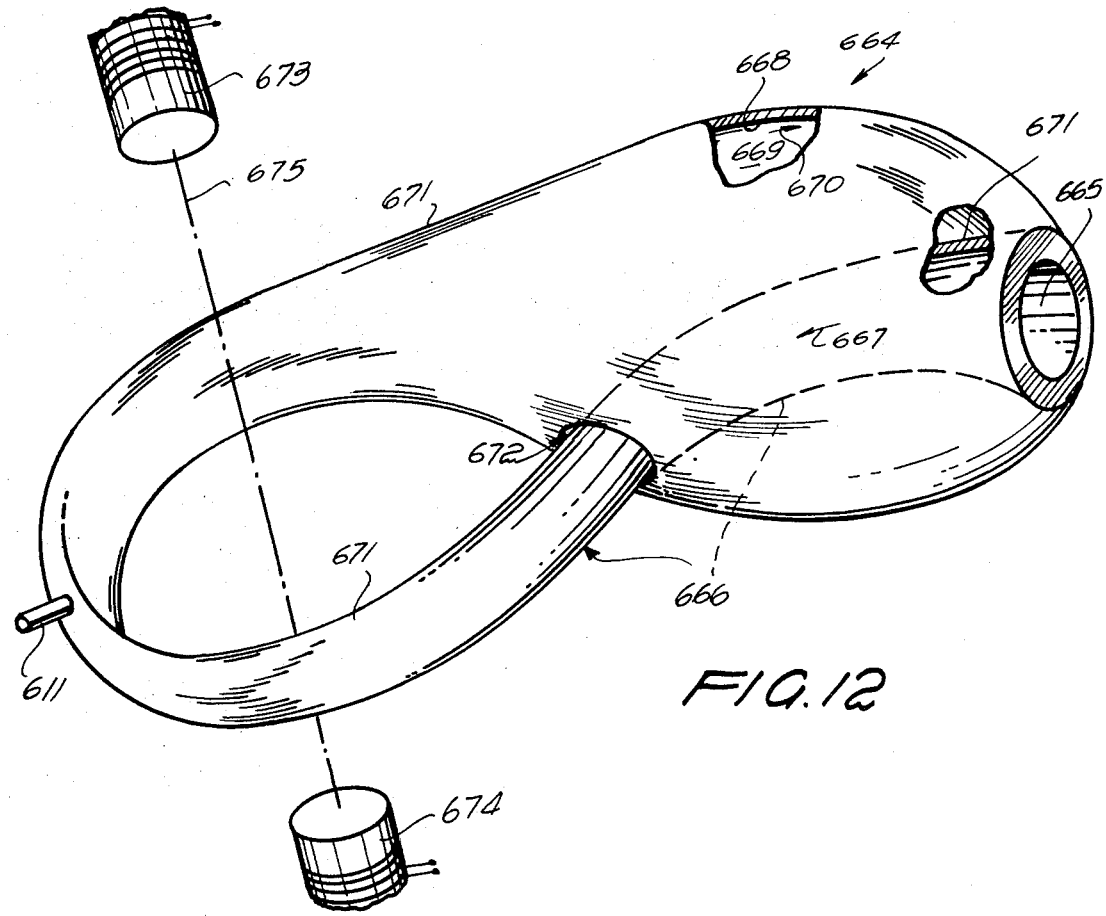
FIG. 12 is a perspective view of a Klein's bottle to which the present invention may be applied.

In the embodiment of FIG. 12, a Klein's bottle 664 is shown which represents another geometric entity of an endless non-orientable surface which is a true three dimensional entity. As is well known, the Klein's bottle defines in fact an endless non-orientable surface. To demonstrate this, it may be assumed that a moving body enters bottom opening 665, moves along the inside of the tunnel defined by the neck 666 in the direction indicated by arrow 667, whereby said body enters within the chamber 669 defined by face 668 and if such body continues to move along face 668, it will follow the direction indicated by arrow 670 to move then along face 671 of neck 666, leaving chamber 669 through opening 672 to continue moving on neck 666, more particularly face 671, until again reaching the bottom opening 665. In practice the moving body will be the electrons of the electric charges. A pair of outside electromagnets 673, 674 may be aligned on axis 675 passing through the space encircled by the neck 666, to create the electromagnetic field in a manner similar as the electromagnetic field produced by coil 37 of FIG. 1. In this embodiment no casing is shown equivalent to casing 13 of the embodiment of FIG. 1, but nevertheless such casing will be necessary. Holder 611 is also schematically shown, inasmuch as the latter is necessary to define the equivalent of line 14 of the embodiment of FIG. 1. This example is merely given to demonstrate that the invention is not limited to a two dimensional entity, i.e. a Möbius band.

Figure 13:
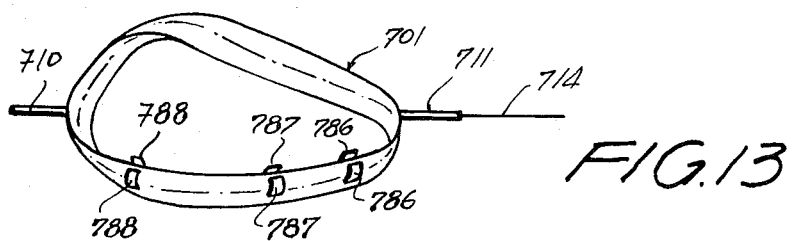
FIG. 13 is a schematic illustration showing a Möbius band with a Cockroft-Walton accelerator.

In FIG. 13 another way of providing the necessary acceleration for the electrons in order to provide a direction controlled movement of electrons along the Möbius band 701 is shown, consisting of a Cockroft-Walton accelerator arrangement. More particularly, holders 710 and 711 are of the usual type and adjacent holder 711 which is provided with the feeding line 714 a first pair of plates 786 is provided, which are positively charged, bearing in mind that the feeding line 714 will provide negative electric charges to the Möbius band 701. Additional pairs of positively charged plates 787 and 788 are provided at increasing length intervals along the Möbius band 701, so that a potential difference in the electric field is created, whereby the electrons of the electric charges fed onto the Möbius band 701 are impelled along the Möbius band 701 with increasing speed. Thus, in this embodiment the electromagnetic field is replaced by another type of electron accelerator.

It will be understood that improvements may be introduced into the embodiments described by way of examples and modifications may be made in the method for storing electric energy without departing from the scope of the invention specifically defined in the following claims.

I claim:

1. A method for storing electric energy, comprising the steps of providing (a) at least one electric conductor having an endless non-orientable surface, said conductor being made of a metal or alloy capable of becoming superconductive upon cooling it below its transition point, (b) cooling means and cooling said conductor below its transition point, (c) means for creating a magnetic field perpendicular to a plane passing through the center line of said conductor, (d) starting to electrically charge said conductor and (e) generating said magnetic field at the latest after having started with the electric charge to move the electrons along said conductor through the influence of said magnetic field and to longitudinally polarize said electrons due to the geometric property of said non-orientable surface, thereby increasing the capacity of said electric conductor to allow for extremely high density electric charges.

2. The method of claim 1, wherein the magnetic field is only generated for a short period at the latest after having started with the electric charge to move and accelerate the electrons along said conductor through the influence of said magnetic field, said electrons being accelerated to a velocity which is kept below 90 percent of the velocity of light.

3. The method of claim 1, wherein the magnetic field is generated by an induction accelerator, said magnetic field is an outwardly decreasing magnetic field and said conductor is so housed in said magnetic field that the portion which is connected to means for charging said conductor is arranged within the weakest zone of said magnetic field.

4. An electric energy storage system comprising at least one electric conductor having an endless non-orientable surface, said conductor being a metallic conductor capable of becoming superconductive upon cooling it below its transition point, said conductor being housed and insulatingly suspended in a casing defining a chamber, means for cooling said conductor within said chamber below the transition point of said conductor, said conductor having an endless center line, controllable means for creating a magnetic field substantially perpendicular to a plane passing through said center line, an insulated static electricity conducting line connected to said conductor and projecting out of said casing, said conductor being connectable at one point through said line, to static electricity feeding means for loading said conductor, and said line being furthermore connectable to means to be driven by the static electricity stored on said conductor.

5. The electric energy storage system of claim 4, wherein said electric conductor is a Möbius band.

6. The electric energy storage system of claim 4, wherein said electric conductor is a Klein's bottle.

7. The electric energy storage system of claim 5, wherein said Möbius band is supported by diametrically opposite holders, one of which is made of electricity insulating material and the other of which is made of electricity conducting material, both holders are insulatingly supported by said casing, said insulated static electricity conducting line being connected to said other holder.

8. The electric energy storage system of claim 5, wherein a plurality of Möbius bands are housed in said chamber and supported by diametrically opposite holders defining a substantially elliptical entity with a central axial through-opening for the passage of said means for creating a magnetic field, one of said holders is made of electricity insulated material and supports in spaced apart relationship said Möbius bands and the other of said holders is made of electricity conducting material supporting and electrically interconnecting said Möbius bands, said insulated static electric conducting line is connected to said last mentioned holder.

9. The electric energy storage system of claim 5, wherein said Möbius band is a thin metallic conductive layer deposited of an electricity insulating support.

10. The electric energy storage system of claim 9, wherein a layer of insulating material covers said metallic conductive layer.

11. The electric energy storage system of claim 4, wherein said means for cooling said conductor consists in pump means connected to said casing for producing vacuum in said casing, a second casing surrounding the first mentioned casing and connected through pump means to a source of helium gas.

12. The electric energy storage system of claim 11, wherein a third casing surrounds said second casing and being connected through pump means to a source of liquefied helium.

13. The electric energy storage system of claim 11, wherein a hollow sealed member is further housed in said chamber housing said electric conductor having an endless non-orientable surface, said hollow sealed member containing paramegnetic crystalline salts and a coil capable of periodically magnetizing and adiabatically demagnetizing said salts for generating additional frigories in said chamber.

14. The electric energy storage system of claim 13, wherein said coil is connected to said electric conductor having said endless non-orientable surface, through pulse extracting means.

15. The electric energy storage system of claim 5, wherein said controllable means for creating said magnetic field substantially perpendicular to said plane passing through said center line, is a coil passing through the space encircled by said Möbius band.

16. The electric energy storage system of claim 5, wherein said controllable means for creating said magnetic field substantially perpendicular to said plane passing through said center line, is a cylindrical coil surrounding said Möbius band.

17. The electric energy storage system of claim 4, wherein said casing defining said chamber houses a plurality of substantially parallelly arranged Möbius bands, each defining one of said electric conductors having an endless non-orientable surface, each Möbius band being supported by a first holder made of electricity insulating material and a second holder, diametrically opposite to said first holder, made of electricity conductive material, the second holders being connected in parallel within said chamber and further connected to said insulated static electricity conducting line.

18. A method for storing electric energy, comprising the steps of providing (a) at least one electric conductor having an endless non-orientable surface, said conductor being made of a metal or alloy capable of becoming superconductive upon cooling it below its transition point, (b) cooling means and cooling said conductor below its transition point, (c) starting to electrically charge said conductor and (d) generating impelling forces to move the electrons of the electric charges along said electric conductor to provide a direction controlled movement of electrons along said conductor and to longitudinally polarize said electrons due to the geometric property of said non-orientable surface, thereby increasing the capacity of said electric conductor to allow for extremely high density electric charges.

19. An electric energy storage system, comprising at least one electric conductor having an endless non-orientable surface, said conductor being a metallic conductor capable of becoming superconductive upon cooling it below its transition point, said conductor being housed and insulatingly suspended in a casing defining a chamber, means for cooling said conductor within said chamber below the transition point of said conductor, an insulated static electricity conducting line connected to said conductor and projecting out of said casing, said conductor being connectable at one point through said line, to static electricity feeding means for loading said conductor, and said line being furthermore connectable to means to be driven by the static electricity stored on said conductor.

20. An electric energy storage system, comprising at least one electric conductor having an endless non-orientable surface, a static electricity conducting line connected to said conductor, said conductor being connectable at one point through said line, to static electricity feeding means for loading said conductor, and said line being furthermore connectable to means to be driven by the static electricity stored on said conductor, said static electricity feeding means and said means to be driven by the static electricity stored on said conductor are respectively furthermore connected to ground.

21. An electric energy storage system, comprising at least one electric conductor having an endless non-orientable surface, said conductor being a metallic conductor capable of becoming superconductive upon cooling it below its transition point, said conductor being housed and insulatingly suspended in a casing defining a chamber, means for cooling said conductor within said chamber below the transition point of said conductor, means for generating impelling forces adapted to move electrons of electric charges along said electric conductor to provide a direction controlled movement of electrons along said conductor, an insulated static electricity conducting line connected to said conductor and projecting out of said casing, said conductor being connectable at one point through said line, to static electricity feeding means for loading said conductor, and said line being furthermore connectable to means to be driven by the static electricity stored on said conductor.

22. The electric energy storage system of claim 21, wherein said means for generating impelling forces is a Cockroft-Walton accelerator arranged along a portion of said electric conductor adjacent the connection of said insulated static electricity conducting line with said electric conductor.

23. A method for storing electric energy, comprising the steps of providing (a) at least one electric conductor having an endless non-orientable surface, (b) starting to electrically charge said conductor and (c) generating impelling forces to move the electrons of the electric charges along said electric conductor to provide a direction controlled movement of electrons along said conductor and to longitudinally polarize said electrons due to the geometric property of said non-orientable surface, thereby increasing the capacity of said electric conductor to allow for extremely high density electric charges.

* * * * *